(No Model.)

G. A. STONE.
WAGON BOX UNLOADER.

No. 391,723. Patented Oct. 23, 1888.

WITNESSES.
M. B. Harris.
O. R. Ferguson.

INVENTOR.
George A. Stone,
by E. W. Anderson
his Attorney.

UNITED STATES PATENT OFFICE.

GEORGE ALEXANDER STONE, OF RICHMOND, MISSOURI.

WAGON-BOX UNLOADER.

SPECIFICATION forming part of Letters Patent No. 391,723, dated October 23, 1888.

Application filed November 26, 1887. Serial No. 256,229. (No model.)

*To all whom it may concern:*

Be it known that I, GEORGE ALEXANDER STONE, a citizen of the United States, and a resident of Richmond, in the county of Ray and State of Missouri, have invented certain new and useful Improvements in Wagon-Box Unloaders; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
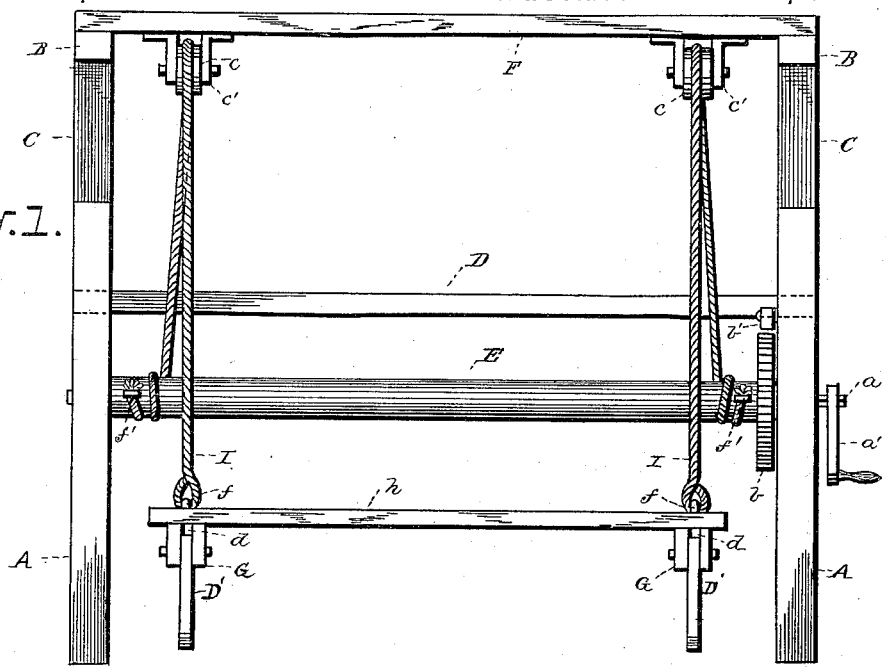
Figure 2:
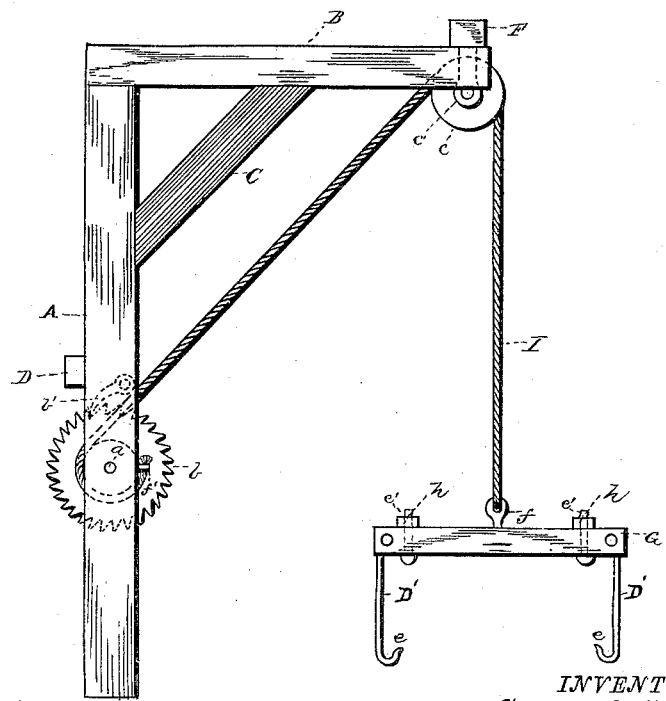

Figure 1 of the drawings is a representation of the front of the invention. Fig. 2 is a side view.

My invention relates to improvements in devices for lifting wagon-boxes free from the wagon; and it consists in the construction and novel combination of parts, as hereinafter specified.

The object of my invention is to provide a wagon-box lifter of simple construction and so arranged as to retain the box in an elevated position free from the ground, and under which the wagon may be drawn to replace the box.

In the drawings, A represents two vertical posts, the lower ends of which are securely embedded in the ground, or they may be tenoned into floor-timbers of a barn or shed. Arms B are placed at a right angle from the tops of the posts A, to which they are rigidly braced by the braces C. The posts A are connected by the cross-bar D, firmly bolted at its ends to the rear sides of the posts. A windlass, E, is journaled at its ends between and to the posts A. The windlass-journal $a$ extends through one of the vertical posts and is provided with the crank $a'$, and a ratchet-wheel, $b$, is secured to the windlass, the teeth of which engage the pawl $b'$, pivoted to the post. A horizontal bar, F, is bolted to the outer ends of the arms B, on the under side of which pulleys $c$ are journaled in the hangers $c'$.

G designates the lifting-bars, the ends having the openings $d$ therein. Grappling-rods D' are loosely pivoted in the openings $d$. The lower or free ends of the grappling-rods are turned inward and upward to form the hooks $e$.

The lifting-bars G are held in the proper parallel position and distance apart by the two horizontal bars $h$, the ends of which turn slightly on the pins or bolts $e'$, standing up from the lifting-bars.

I shows the lifting-ropes fastened at one end to the eyes $f$ in the center of the bars G, the ropes then passing over the pulleys $c$ and to the windlass E, where the opposite ends are fastened by means of the staples $f'$.

To remove a wagon-box from the wagon, the wagon is drawn directly under the grappling-frame, which is then lowered by relieving the ratchet-wheel from the pawl and turning the crank. The grappling-rods engage the outer sides of the wagon-box and the hooked ends are brought in contact with the under edges of the box. The pawl is then placed in position and, turning the crank in a reverse direction, the box is lifted free and suspended.

The grappling-rods and the bars $h$ being loosely pivoted, allows the easy adjustment of the device to boxes of different widths, or when the box is not quite parallel with the horizontal position of the apparatus.

Having described my invention, what I claim, and desire to secure by Letters Patent, is—

The combination of the vertical posts A, the arms B at right angles, the braces C, and the cross-bars D F, the windlass E, journaled in bearings in the vertical posts, the ratchet $b$, the pawl engaging therewith, the crank $a'$, the pulleys journaled in the depending brackets $c'$, the ropes, and the lifting-frame consisting of the bars G, having the bifurcated ends, the depending hooks $e$, pivoted therein, and the horizontal bars $h$, pivoted to the bars G, substantially as specified.

In testimony whereof I affix my signature in presence of two witnesses.

GEORGE ALEXANDER STONE.

Witnesses:
 GEORGE W. LAVELOCK,
 ROBERT B. KICE.